United States Patent
Hayashi

(10) Patent No.: US 11,256,026 B2
(45) Date of Patent: Feb. 22, 2022

(54) MULTICORE OPTICAL FIBER AND MULTICORE OPTICAL FIBER CABLE

(71) Applicant: SUMITOMO ELECTRIC INDUSTRIES, LTD., Osaka (JP)

(72) Inventor: Tetsuya Hayashi, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 17/025,792

(22) Filed: Sep. 18, 2020

(65) Prior Publication Data

US 2021/0003774 A1 Jan. 7, 2021

Related U.S. Application Data

(63) Continuation of application No. PCT/JP2019/007637, filed on Feb. 27, 2019.

(30) Foreign Application Priority Data

Apr. 9, 2018 (JP) .............................. JP2018-074674

(51) Int. Cl.
G02B 6/02 (2006.01)
G02B 6/028 (2006.01)
G02B 6/036 (2006.01)

(52) U.S. Cl.
CPC ....... G02B 6/02042 (2013.01); G02B 6/0281 (2013.01); G02B 6/0365 (2013.01);
(Continued)

(58) Field of Classification Search
None
See application file for complete search history.

(56) References Cited

U.S. PATENT DOCUMENTS

2013/0301998 A1 11/2013 Hayashi
2017/0102501 A1* 4/2017 Hayashi ................. G02B 6/268
(Continued)

FOREIGN PATENT DOCUMENTS

JP 2017-009629 A 1/2017
JP 2017-167196 A 9/2017
(Continued)

OTHER PUBLICATIONS

T. Hayashi et al., "Coupled-Core Multi-Core Fibers: High-Spatial-Density Optical Transmission Fibers with Low Differential Modal Properties," ECOC2015, We.1.4.1, 2015.
(Continued)

*Primary Examiner* — Chris H Chu
(74) *Attorney, Agent, or Firm* — Faegre Drinker Biddle & Reath LLP

(57) ABSTRACT

An MCF cable according to an embodiment contains a plurality of MCFs each including at least one coupled core group and a common cladding. $\Lambda$ is set such that $\kappa$ at a wavelength of 1550 nm is falls within a range of from $1 \times 10^{-1}$ [m$^{-1}$] to $1 \times 10^{3}$ [m$^{-1}$], and $(\beta \Lambda C_{avg})/(2\kappa)$ or $(\beta \Lambda C_f)/(2\kappa)$ is set in a specific range in a wavelength band of from 1530 nm to 1625 nm, where $C_{avg}$ [m$^{-1}$], $C_f$ [m$^{-1}$], and $f_{twist}$ [turn/m] represent the average curvature, the pseudo-curvature, and the average torsion, respectively, for each MCF, and $\kappa$ [m$^{-1}$], $\beta$ [m$^{-1}$], and $\Lambda$ [m] represent the coefficient of mode coupling between adjacent cores, the average of propagation constants, and the core center-to-center distance, respectively.

11 Claims, 9 Drawing Sheets

(52) U.S. Cl.
CPC ...... *G02B 6/03611* (2013.01); *G02B 6/03627* (2013.01); *G02B 6/03633* (2013.01)

(56) References Cited

U.S. PATENT DOCUMENTS

2017/0227410 A1   8/2017   Abedin
2019/0041574 A1*  2/2019   Hasegawa ............ G02B 6/2551

FOREIGN PATENT DOCUMENTS

WO   WO-2013/161825 A1   10/2013
WO   WO-2017/061184      4/2017

OTHER PUBLICATIONS

S. Fan and J. M. Kahn, "Principal modes in multimode waveguides," Opt. Lett., 30(2), 2005, p. 135-p. 137.
M. Koshiba, K. Saitoh, K. Takenaga, and S. Matsuo, "Analytical expression of average power-coupling coefficients for estimating intercore crosstalk in multicore fibers," IEEE Photonics Journal, vol. 4, No. 5, 2012, p. 1987-p. 1995.
T. Hayashi, T. Sasaki, E. Sasaoka, K. Saitoh, and M. Koshiba, "Physical interpretation of intercore crosstalk in multicore fiber: effects of macrobend, structure fluctuation, and microbend," Optics Express, vol. 21, No. 5, 2013, p. 5401-p. 5412.
Sakamoto et al., "Fiber twisting- and bending-induced adiabatic/nonadiabatic super-mode transition in coupled multicore fiber," Journal of Lightwave Technology, Feb. 15, 2016, vol. 34, No. 4, p. 1228-p. 1237.
T. Sakamoto et al., "The coupled 12-core fiber with high core density," Proceedings of the Society Conference 2 of IEICE Technical Report 2017, Mar. 22, 2017, p. B-13-25.

* cited by examiner

MULTICORE OPTICAL FIBER AND MULTICORE OPTICAL FIBER CABLE

CROSS-REFERENCE TO RELATED APPLICATIONS

This application is a continuation application of PCT/JP2019/007637 claiming the benefit of priority of the Japanese Patent Application No. 2018-074674 filed on Apr. 9, 2018, the entire contents of which are incorporated herein by reference.

TECHNICAL FIELD

The present disclosure relates to a multicore optical fiber (hereinafter, referred to as an "MCF") and an MCF cable including the MCF.

BACKGROUND ART

In recent years, an optical fiber transmission system that compensates for crosstalk between spatial modes by using a multi-input and multi-output (MIMO) signal processing technology and enables space division multiplexed transmission is under development. As one of transmission media applicable to such an optical fiber transmission system, for example, an MCF including a coupled core group in which a plurality of cores are arranged to cause mode coupling between the cores is known, and causing mode coupling between the plurality of cores allows the coupled core group to be regarded as substantially one multimode transmission line.

CITATION LIST

Non Patent Literature

Non-Patent Document 1: ECOC2015, We.1.4.1
Non-Patent Document 2: JLT 34(4), 1228 (2016).
Non-Patent Document 3: S. Fan and J. M. Kahn, "Principal modes in multimode waveguides," Opt. Lett. 30(2), 135-137 (2005).
Non-Patent Document 4: M. Koshiba, K. Saitoh, K. Takenaga, and S. Matsuo, "Analytical expression of average power-coupling coefficients for estimating intercore crosstalk in multicore fibers," IEEE Photon. J. 4(5), 1987-1995 (2012).
Non-Patent Document 5: T. Hayashi, T. Sasaki, E. Sasaoka, K. Saitoh, and M. Koshiba, "Physical interpretation of intercore crosstalk in multicore fiber:effects of macrobend, structure fluctuation, and microbend," Opt. Express 21(5), 5401-5412 (2013).
Non-Patent Document 6: T. Sakamoto, T. Mori, M. Wada, T. Yamamoto, F. Yamamoto, and K. Nakajima, "Fiber twisting and bending induced adiabatic/nonadiabatic supermode transition in coupled multi-core fiber.," J. Lightw. Technol., vol. 34, no. 4, pp. 1228-1237, February 2016.

SUMMARY OF INVENTION

The multicore optical fiber cable (MCF cable) according to the present disclosure contains a plurality of multicore optical fibers (MCFs). Each of the MCFs includes at least one coupled core group and a common cladding surrounding the coupled core group. Note that the coupled core group includes a plurality of cores. Further, each of the MCFs has a core structure adjusted to satisfy the first and second conditions, core arrangement, and average torsion (fiber torsion), where $C_{avg}$ [m$^{-1}$] represents an average curvature of bending of the MCF along the longitudinal direction of the MCF no bending applied to the MCF cable, $C_f$ [m$^{-1}$] represents a pseudo-curvature of the MCF, $f_{twist}$ [turn/m] represents an average torsion of the MCF, $\kappa$ [m$^{-1}$] represents a coefficient of mode coupling between adjacent cores of the plurality of cores, $\beta$ [m$^{-1}$] represents an average of propagation constants of the adjacent cores, and $\Lambda$ [m] represents a core center-to-center distance between the adjacent cores. The first condition is that the core center-to-center distance $\Lambda$ is set so as to make the coefficient $\kappa$ of mode coupling between the adjacent cores at a wavelength of 1550 nm fall within a range of from $1\times10^{-1}$ [m$^{-1}$] to $1\times10^{3}$ [m$^{-1}$]. The second condition is that mode coupling with at least one tenth of the maximum randomness is achieved.

BRIEF DESCRIPTION OF DRAWINGS

FIG. 5A is a graph showing a relationship between a parameter b in Expression (1) and DGD/a.

DESCRIPTION OF EMBODIMENTS

Figure 1:
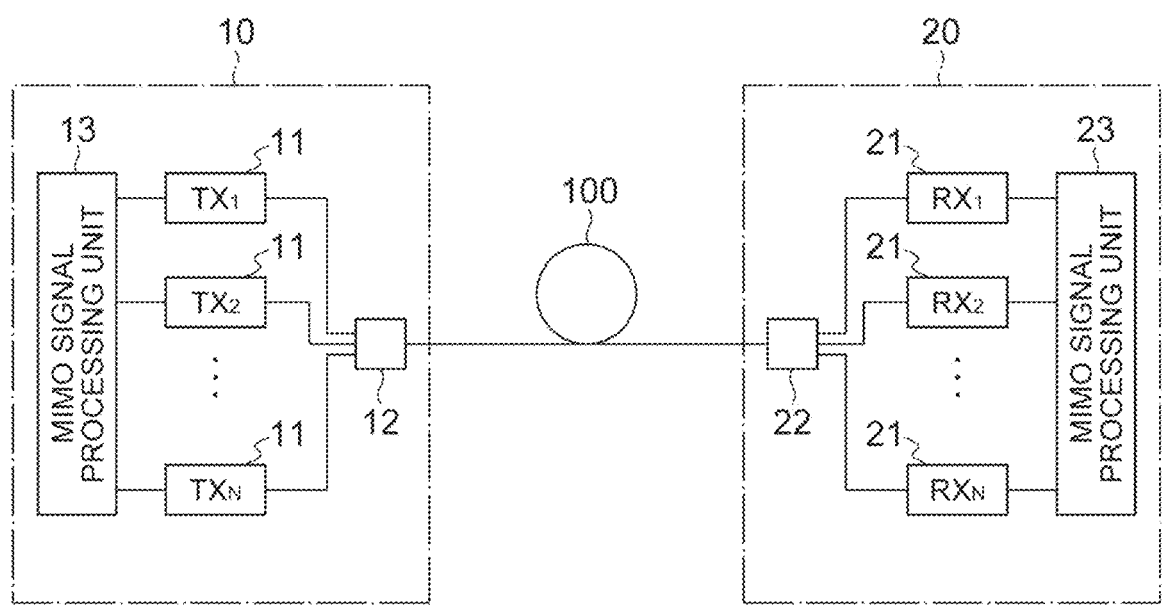
FIG. 1 is a diagram showing a schematic structure of an optical fiber transmission system to which an MCF according to the present disclosure is applicable.

Problem to be Solved by Present Disclosure

The inventor has found the following problems from a study of an MCF (coupled MCF) including a coupled core group applicable to a conventional optical fiber transmission system. That is, in a case of spatial multiplexed transmission using such a conventional optical fiber transmission system, it is necessary to reduce differential group delay (DGD) between spatial modes in order to suppress an increase in complexity of MIMO signal processing. As far as the inventor knows, in an MCF in which random mode coupling occurs, the DGD between spatial modes has sometimes been reduced in a manner that depends on a core center-to-center distance between adjacent cores and fiber torsion in the coupled core group; however, it is unknown that what type of coupled MCF reduces the DGD between spatial modes.

In other words, it is unknown that when the degree of mode coupling between cores making up the coupled core group is too high, the linearity between the core center-to-center distance and the DGD between spatial modes is lost. That is, it is assumed that, in the coupled core group having an appropriate core center-to-center distance, fiber bending and fiber torsion cause a large number of discrete random mode couplings along the longitudinal direction of the fiber, so that the accumulation of the DGD between spatial modes slows down. On the other hand, it is assumed that, when the core center-to-center distance is very short, perturbation applied to coupling between cores due to fiber bending and fiber torsion becomes small relative to the strength of the mode coupling between cores, and as a result, random mode coupling is less likely to occur, and the accumulation of the DGD between spatial modes becomes large. For example, Non-Patent Document 1 discloses that the random mode coupling occurring in each coupled core group of the coupled MCF is affected by fiber bending and torsion, from the viewpoint of mode coupling between core modes. Further, Non-Patent Document 2 discloses that the random mode coupling occurring in each coupled core group of the coupled MCF is affected by fiber bending and torsion, from the viewpoint of mode coupling between eigenmodes.

However, neither Non-Patent Document 1 nor Non-Patent Document 2 discloses what type of coupled MCF enables mode coupling that ensures sufficient randomness and can suppress the accumulation of the DGD and loss difference between spatial modes. Specifically, what numerical range within which the coefficient of mode coupling between cores, the core center-to-center distance, the fiber bending radius, the fiber torsion (herein, defined by the average torsion $f_{twist}$), and the like each fall, and what kind of relationship generates the random mode coupling have not been disclosed.

The present disclosure has been made in order to solve the above-described problems, and it is therefore an object of the present disclosure to provide an MCF having a structure for efficiently causing random mode coupling between cores making up a coupled core group and an MCF cable including the MCF.

Advantageous Effects of Present Disclosure

According to the present disclosure, random mode coupling between cores making up the coupled core group occurs with high efficiency, and thus the accumulation of the DGD and loss difference between spatial modes can be effectively reduced.

Description of Embodiment of Present Disclosure

First, details of the embodiment of the present disclosure will be individually listed and described.

(1) A multicore optical fiber cable (MCF cable) according to the present disclosure includes a plurality of multicore optical fibers (MCFs). An MCF according to the present disclosure is an MCF that is applicable to the MCF cable according to the present disclosure and corresponds to each of the MCFs described above. Further, each of the MCFs includes at least one coupled core group including a plurality of cores, and a common cladding surrounding the coupled core group.

(2) Each of the MCFs included in the MCF cable according to the present disclosure and the MCF according to the present disclosure have, as one aspect of the present disclosure, a structure for allowing low spatial mode dispersion (defined by the standard deviation of the autocorrelation function of an impulse response) based on fiber bending curvature at the production of a cable. Specifically, minute fiber bending (micro-bending) or perturbation occurs even when the MCF is macroscopically in a linear state (the fiber bending curvature is macroscopically zero). A pseudo-curvature $C_f$ [m$^{-1}$] of the MCF, which is fiber bending curvature that imaginarily represents the effect of this micro-bending or perturbation on the assumption that macro-fiber bending is applied, is defined by $C_f = C_{bend} \cdot h_b / h_s$ ($h_b$ represents a coefficient of power coupling between cores with the optical fiber bent with curvature $C_{bend}$ of 5 [m$^{-1}$] or more, and $h_s$ represents a coefficient of power coupling between cores with the optical fiber made straight with bending curvature of 0.1 [m$^{-1}$] or less). Further, with the average curvature of bending of the MCF included in the MCF cable along the longitudinal direction of the MCF denoted by $C_{avg}$ [m$^{-1}$], the average torsion of the MCF denoted by $f_{twist}$ the coefficient of mode coupling between adjacent cores of the plurality of cores making up the coupled core group denoted by $\kappa$ [m$^{-1}$], the average of propagation constants of the adjacent cores in the coupled core group denoted by $\beta$ [m$^{-1}$], and the core center-to-center distance between the adjacent cores in the coupled core group denoted by $\Lambda$ [m], the MCF preferably satisfies the following first and second conditions.

Note that, as the first condition, the core center-to-center distance $\Lambda$ between the adjacent cores is set so as to make the coefficient $\kappa$ of mode coupling between the adjacent cores at the wavelength of 1550 nm fall within a range of from $1 \times 10^{-1}$ [m$^{-1}$] to $1 \times 10^3$ [m$^{-1}$]. As the second condition, in the wavelength band of from 1530 nm to 1625 nm, the value of X defined by $(\beta \Lambda C_{avg})/(2\kappa)$ or $(\beta \Lambda C_f)/(2\kappa)$ satisfies the following Expression (1):

$$0.22\rho \sqrt{1 + \left(a\frac{\kappa}{f_{twist}}\right)^2} \leq X \leq 13.5\rho \sqrt{1 + \left(a\frac{\kappa}{f_{twist}}\right)^2} \quad (1)$$

$$\rho = \begin{cases} 1 - \dfrac{d}{2} \dfrac{\ln\left(\frac{\kappa/f_{twist}}{b}\right)^{\frac{c}{2}}}{\left(\frac{\kappa/f_{twist}}{b}\right)^{\frac{c}{2}}}, & (\kappa/f_{twist} < b) \\ 1, & (\kappa/f_{twist} \geq b) \end{cases}$$

$a = 0.722$ $b = 3.867207$ $c = -4.172137$ $d = 1.715737$.

As described above, satisfying the first and second conditions causes mode coupling that ensures sufficient randomness. As a result, it is possible to reduce the accumulation of DGD and loss difference between spatial modes and increase the number of cores per unit fiber-cross-sectional area.

(3) As one aspect of the present disclosure, the value of X may satisfy the following Expression (2):

$$0.30\rho \sqrt{1 + \left(a\frac{\kappa}{f_{twist}}\right)^2} \leq X \leq 6.6\rho \sqrt{1 + \left(a\frac{\kappa}{f_{twist}}\right)^2}. \quad (2)$$

In this case, the degree of randomness of mode coupling can be increased, and the accumulation of DGD and loss difference between spatial modes can be further reduced.

(4) As one aspect of the present disclosure, it is preferable that the average curvature $C_{avg}$ fall within a range of from 0.1 [m$^{-1}$] to 20 [m$^{-1}$]. Further, as one aspect of the present disclosure, it is preferable that the imaginary curvature $C_f$ fall within a range of from 0.01 [m$^{-1}$] to 1 [m$^{-1}$]. Furthermore, as one aspect of the present disclosure, the average curvature $C_{avg}$ may fall within either the first range or the second range. The first range is defined as a range of 0.3 [m$^{-1}$] or more. The second range is defined as a range of 10 [m$^{-1}$] or less. Note that the average curvature $C_{avg}$ described in the aspects is a range based on the fiber bending curvature in the cable suitable for long-haul transmission.

(5) Each of the MCFs included in the MCF cable according to the present disclosure and the MCF according to the present disclosure each preferably serve as a coupled MCF for long-haul transmission and have characteristics listed below as one aspect the present disclosure. Specifically, each of the MCFs included in the MCF cable according to the present disclosure preferably has transmission loss during all-mode excitation, a mode average of chromatic dispersion, bending loss per turn in all spatial modes, bending loss in all the spatial modes, bending loss per 100 turns in all the spatial modes, an average of mode-dependent loss, and an average of maximum DGD between spatial modes at each wavelength that fall within the respective ranges listed below.

That is, the transmission loss during all-mode excitation is preferably 0.20 dB/km or less, 0.18 dB/km or less, 0.16 dB/km or less, or 0.15 dB/km or less, in the wavelength band of from 1530 nm to 1565 nm or the wavelength band of from 1460 nm to 1625 nm. The mode average of chromatic dispersion is preferably 16 ps/(nm·km) or more.

In all the spatial modes, the bending loss in a condition wound on a mandrel with a diameter of 30 mm for one turn is preferably 0.2 dB or less at the wavelength of 1550 nm. In all the spatial modes, the bending loss in a condition wound on a mandrel with a diameter of 20 mm is preferably 20 dB/m or less at the wavelength of 1550 nm. In all the spatial modes, the bending loss in a condition wound on a mandrel with a radius of 30 mm for 100 turns is preferably 0.5 dB or less at the wavelength of 1550 nm. In the wavelength band of from 1530 nm to 1565 nm or the wavelength band of from 1460 nm to 1625 nm, the average of mode-dependent loss is preferably 0.01 dB/km$^{1/2}$ or less. In the wavelength band of from 1530 nm to 1565 nm or the wavelength band of from 1460 nm to 1625 nm, the average of spatial mode dispersion is preferably 10 ps/km$^{1/2}$ or less. Further, in the wavelength band of from 1530 nm to 1565 nm or the wavelength band of from 1460 nm to 1625 nm, the average of maximum DGD between spatial modes at each wavelength is preferably 10 ps/km$^{1/2}$ or less.

(6) Each of the MCFs included in the MCF cable according to the present disclosure and the MCF according to the present disclosure may each satisfy, as one aspect of the present disclosure, the following third condition in addition to the first condition. Specifically, as the third condition, under a condition where the average curvature $C_{avg}$ is set in a range of from 0.1 [m$^{-1}$] to 20 [m$^{-1}$] or a range of from 0.3 [m$^{-1}$] to 10 [m$^{-1}$], in the wavelength band of from 1530 nm to 1625 nm, the value of X defined by $(\beta\Lambda C_{avg})/(2\kappa)$ or $(\beta\Lambda C_f)/(2\kappa)$ satisfies the following Expression (3):

$$0.22\rho\sqrt{1+\left(a\frac{\kappa}{f_{twist}}\right)^2} \leq X \leq 13.5\rho\sqrt{1+\left(a\frac{\kappa}{f_{twist}}\right)^2} \quad (3)$$

-continued
$$\rho = \begin{cases} 1 - \frac{d}{2}\frac{\ln\left(\frac{\kappa/f_{twist}}{b}\right)^{\frac{c}{2}}}{\left(\frac{\kappa/f_{twist}}{b}\right)^{\frac{c}{2}}}, & (\kappa/f_{twist} < b) \\ 1, & (\kappa/f_{twist} \geq b) \end{cases}$$

$a = 0.722$ $b = 3.867207$ $c = -4.172137$ $d = 1.715737.$

Note that, as one aspect of the present disclosure, it is preferable that the imaginary curvature $C_f$ fall within a range of from 0.01 [m$^{-1}$] to 1 [m$^{-1}$].

(7) As one aspect of the present disclosure, in each of the MCFs included in the MCF cable according to the present disclosure and the MCF according to the present disclosure, the common cladding includes a common optical cladding covering all the plurality of cores making up the coupled core group, and a physical cladding covering the periphery of the optical cladding. Further, in the MCF, the outer diameter of each of the cores making up the coupled core group is preferably 6 μm or more and 15 μm or less. In the cross section of the MCF orthogonal to the longitudinal direction, when the relative refractive index difference based on the refractive index of pure silica is denoted by Δ, it is preferable that the difference between Δ of the area-weighted average of each of the cores and Δ of the optical cladding fall within a range of from 0.2% to 0.5%, that Δ of the physical cladding be greater than the Δ of the optical cladding, and that a difference between the Δ of the physical cladding and the Δ of the optical cladding fall within a range of from 0.0% to 1%, a range of from 0.0% to 0.5%, or a range of from 0.0% to 0.35%.

(8) As one aspect of the present disclosure, the coupled core group may include two to seven cores, and the outer diameter of the physical cladding may be 125±1 μm (a range of from 124 μm to 126 μm). In this configuration, the MCF preferably satisfies the following Expression:

$$D_J/a \geq 7.68 \times 10^{-2} \cdot (\log_{10}(D_{offset}/a))^2 - 2.21 \times 10^{-1} \cdot (\log_{10}(D_{offset}/a)) + 3.15$$

or $$D_J/a \geq 7.57 \times 10^{-2} \cdot (\log_{10}(D_{offset}/a))^2 - 2.25 \times 10^{-1} \cdot (\log_{10}(D_{offset}/a)) + 3.40$$

where $D_J$ represents the shortest distance between the physical cladding and the center of a core closest to the physical cladding, a represents the radius of the closest core, and $D_{offset}$ represents the distance between the center of the optical cladding and the center of the closest core.

As described above, each of the aspects listed in "Description of Embodiment of Present Disclosure" is applicable to all remaining aspects or all combinations of the remaining aspects.

Details of Embodiment of Present Disclosure

Specific examples of the MCF and the MCF cable according to the present disclosure will be described in detail below with reference to the accompanying drawings. It should be noted that the present disclosure is not limited to these examples, and is intended to be defined by the claims and to include all modifications within the scope of the claims and their equivalents. Further, in a description of the drawings, the same components are denoted by the same reference numerals, and a redundant description will be omitted.

FIG. 1 is a diagram showing a schematic structure of an optical fiber transmission system to which an MCF cable according to the embodiment of the present disclosure is applicable. An optical fiber transmission system 1 shown in FIG. 1 includes an MCF 100 according to the embodiment of the present disclosure applied as a transmission channel, a transmitting station 10 disposed at one end of the MCF 100, and a receiving station 20 disposed at the other end of the MCF 100.

The MCF 100 is an MCF including at least one coupled core group including a plurality of cores between which mode coupling occurs. The transmitting station 10 includes a plurality of transmitters 11 ($TX_1$ to $TX_N$) and a connector (fan-in/fan-out device: FI/FO) 12 for guiding an optical signal from each of the transmitters 11 to a corresponding core of the MCF100. Further, the receiving station 20 includes a plurality of receivers 21 ($RX_1$ to $RX_N$) and a connector (FI/FO) 22 for distributing each of the spatial modes propagated through the MCF 100 to a corresponding one of the plurality of the receivers 21. Further, in the optical fiber transmission system 1, as a structure for compensating for crosstalk between the spatial modes induced in the coupled core group of the MCF100 by means of MIMO signal processing, a MIMO signal processing unit 13 is disposed in the transmitting station 10 to control each of the transmitters 11, and a MIMO signal processing unit 23 is disposed in the receiving station 20 to control each of the receivers 21.

Figure 2A:
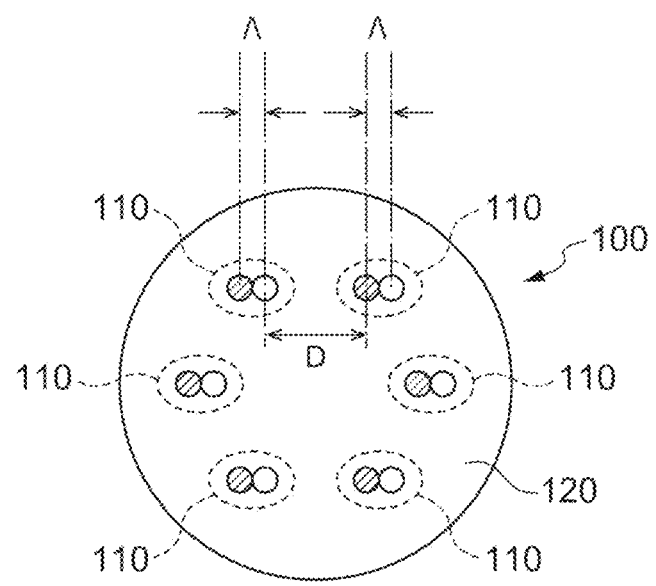
FIG. 2A is a diagram showing an example of a cross-sectional structure of the MCF according to the present disclosure.

FIG. 2A shows a detailed cross-sectional structure of the MCF 100 as an example. The cross-sectional view shown in FIG. 2A represents a cross section orthogonal to the longitudinal direction of the MCF 100. The MCF 100 includes a coupled core group 110 and the common cladding 120 that surrounds the coupled core group 110.

Note that the common cladding 120 includes, for each coupled core group 110, optical cladding that covers all the plurality of cores making up the coupled core group 110, and physical cladding that covers the optical cladding. That is, in the cross section of the MCF 100 shown in FIG. 2A, each region enclosed by a dashed line corresponds to the optical cladding, and the outside of the region enclosed by the dashed line corresponds to the physical cladding.

Each coupled core group 110 includes a plurality of cores that are arranged such that adjacent cores have a predetermined core center-to-center distance Λ to cause mode coupling between the adjacent cores.

Note that the core center-to-center distance Λ is defined by a center-to-center distance between adjacent cores in each coupled core group 110. Further, the number of the coupled core groups 110 may be one or plural. When a plurality of the coupled core groups 110 are provided, the coupled core groups 110 are separated from each other by a distance D so as to sufficiently ensure a non-coupled state (low crosstalk).

Figure 2B:
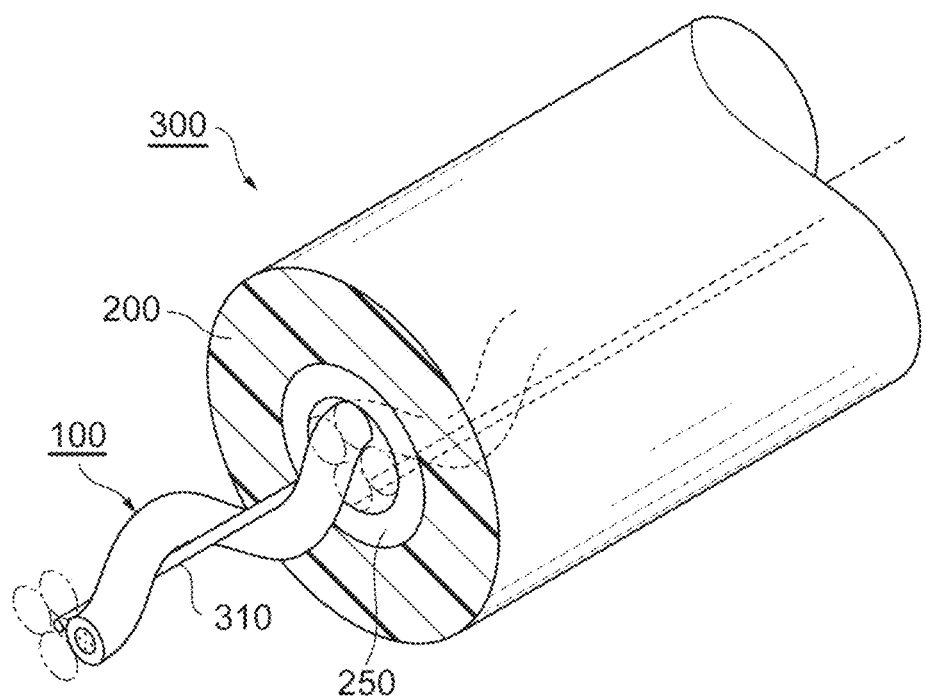
FIG. 2B is a diagram showing an example of a cross-sectional structure of an MCF cable according to the present disclosure.

Further, an MCF cable 300 including the MCFs 100 each having the above-described structure may be laid between the transmitting station 10 and the receiving station 20. FIG. 2B is a diagram showing an example of a structure example of the MCF cable according to the embodiment. As shown in FIG. 2B, the MCF cable 300 includes a support member 310, and the plurality of MCFs 100 wound on the support member 310 that serves as a center axis at predetermined pitches so as to be helically twisted around the support member 310, a reinforcing member 250 wound on the plurality of MCFs 100 so as to maintain the wound state, and a cable jacket 200 covering the periphery of the reinforcing member 250. In the example shown in FIG. 2B, the MCF cable 300 holds four MCFs 100.

Even when the cable extends straight, each of the MCFs 100 is wound on the support member 310 along its longitudinal direction at the predetermined pitches, so that bending with a constant radius of curvature CR is applied to each of the MCFs 100. The cable jacket 200 covers the whole of the reinforcing member 250 so as to protect the MCFs 100 against external force. The reinforcing member 250 may be, for example, an aramid fiber ("Kevlar" (registered trademark) manufactured by Du Pont-Toray Co., Ltd. or "Technora" (registered trademark) manufactured by Teijin Limited). The reinforcing member 250 thus provided can not only reduce elongation strain applied to the MCFs 100 when the MCF cable 300 is pulled, but also play a role of protecting the MCFs 100 against external impact by means of a cushioning effect.

The support member 310 may be a metal material such as a tension member or an anti-shrink material that resists shrinkage of the cable jacket 200. Note that, in the example shown in FIG. 2B, only one MCF 100 is shown for the sake of simple description, but in reality, all the MCFs 100 included in the MCF cable 300 are wound on the support member 310.

Figure 3:
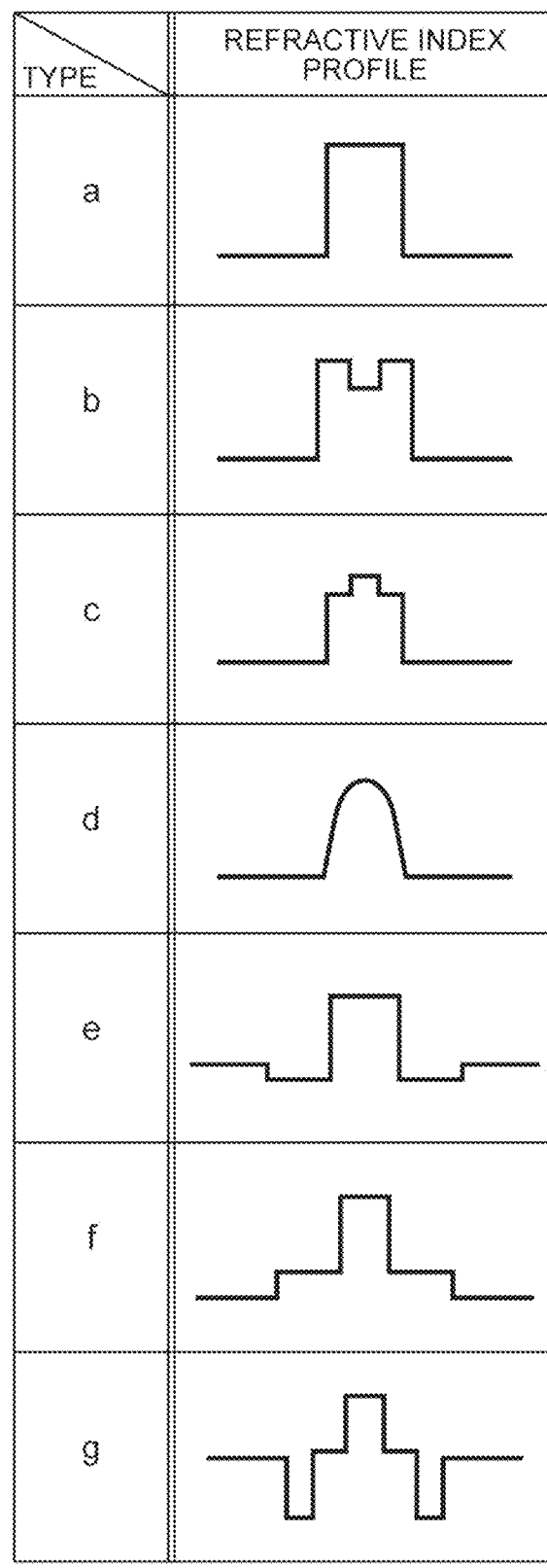
FIG. 3 is a table listing various types of refractive index profile applicable to a region including one core and a part of cladding around the core.

From the viewpoint of the refractive index profile of each core and the optical characteristics associated with the refractive index profile, an appropriate structure can be selected according to uses, but the cores may have a uniform structure or different structures. Further, there is no limit on the number of cores in the cross section of each MCF100, and the cross-sectional diameter (glass diameter) of the MCF100 and the outer diameter of coating resin provided on the outer peripheral surface of the common cladding are appropriately set in a manner that depends on the number of cores to be included. Note that the table shown in FIG. 3 lists various types of refractive index profile applicable to a region including one core and a part of cladding around the core.

Specifically, a profile shape represented by (shape of the refractive index profile of each core)/(shape of the refractive index profile of the optical cladding that covers the core) may be of any type of step/matched type (type a), recessed-tip step/matched type (type b), raised-tip step/matched type (type c), graded/matched type (type d), step/depressed type (type e), double step/matched type (type f), step/trench type (type g), or the like, and the refractive index profile of the core and the refractive index profile of the cladding can be freely combined. Further, each core may have a structure based on a single mode operation in which only a single mode propagates through the core, or a structure based on a multi-mode operation in which a plurality of modes propagate. However, based on the multi-mode operation, the coefficient of power coupling between the cores making up each coupled core group 110 corresponds to the coefficient of power coupling between LP01 of each core.

Figure 4A:
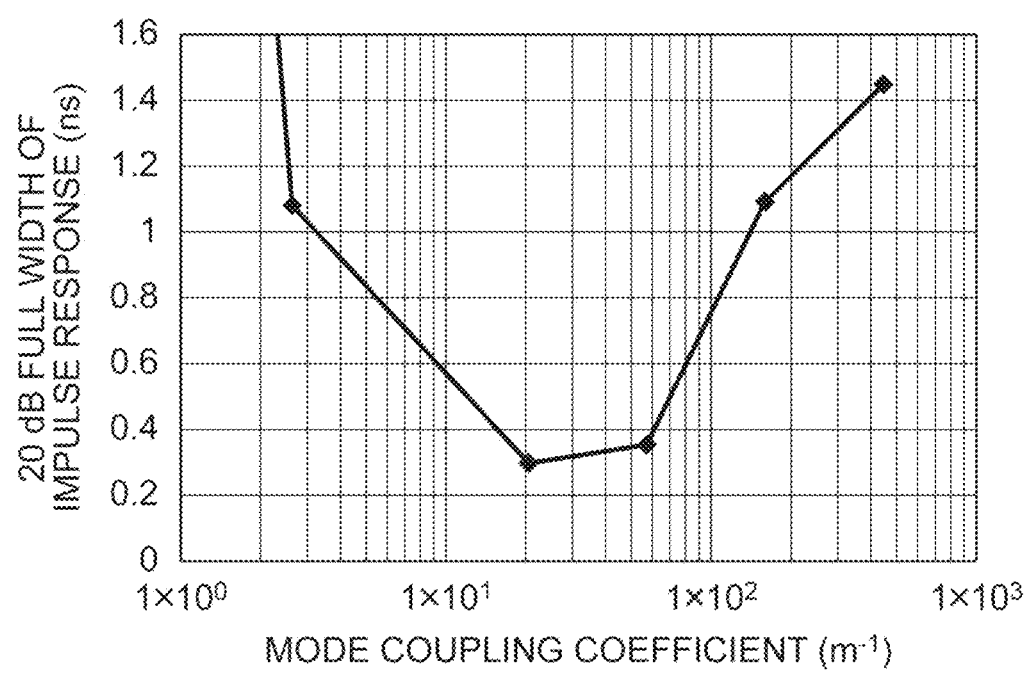
FIG. 4A is a graph showing evaluation results of a 20 dB full width of an impulse response and mode coupling coefficient.
Figure 4B:
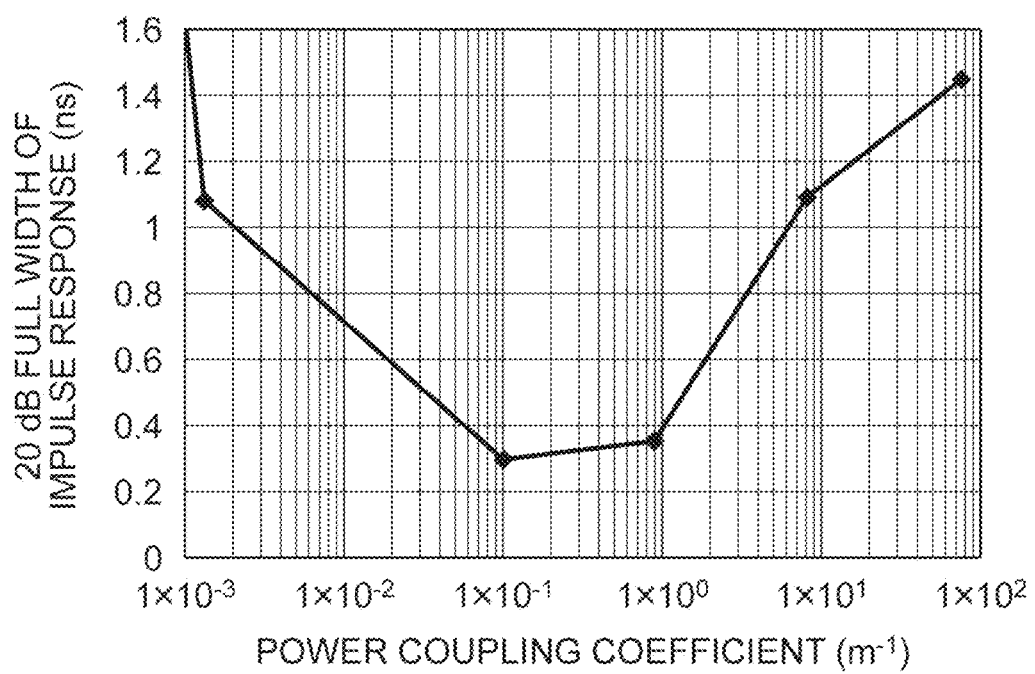
FIG. 4B is a graph showing evaluation results of a 20 dB full width of an impulse response and power coupling coefficient.

FIGS. 4A and 4B are graphs showing evaluation results of a 20 dB full width of an impulse response, mode coupling coefficient, and power coupling coefficient for a plurality of samples prepared as the coupled core group of the MCF 100 according to the embodiment. In particular, FIG. 4A is a graph showing a relationship between the 20 dB full width [ns] of the impulse response (pulse full time width 20 dB lower than the maximum value) and the mode coupling coefficient [$m^{-1}$], and FIG. 4B shows a relationship between the 20 dB full width [ns] of the impulse response and the power coupling coefficient [m$^{-1}$].

Each of the prepared samples 1 to 6 is an MCF including six coupled core groups 110, and each coupled core group 110 includes two cores. Further, the relative refractive index difference Λ of each core relative to the common cladding 120 is 0.41%, and the core diameter of each core is 9.0 μm. The core center-to-center distance Λ of the sample 1 is 12.5 μm, the core center-to-center distance Δ of the sample 2 is 15.0 μm, the core center-to-center distance Λ of the sample 3 is 17.5 jam, the core center-to-center distance Λ of the sample 4 is 20.0 μm, the core center-to-center distance of the sample 5 Λ is 25.0 μm, and the core center-to-center distance Λ of the sample 6 is 27.5 μm. Note that, in each of the samples 1 to 6, the six coupled core groups 110 are separated from each other by the distance D so as to sufficiently ensure the non-coupled state.

In the samples 1 to 6, the fiber length is set to 66 m, and the 20 dB full width of the impulse response at the wavelength of 1550 nm between cores in each coupled core group 110 is evaluated by using optical frequency domain reflectometry (OFDR). Note that, in this OFDR, light is incident from one end of each of the samples 1 to 6 wound on a bobbin with a radius of 140 mm, and the peak of Fresnel reflection at the other end is measured.

Calculated values of the coefficient of mode coupling between the cores of each coupled core group 110 of each of the samples 1 to 6 structured as described above at the wavelength of 1550 nm are 4.5×10$^2$ [m$^{-1}$] for the coupled core group 110 of the sample 1 (Λ=12.5 μm), 1.6×10$^2$ [m$^{-1}$] for the coupled core group 110 of the sample 2 (Λ=15.0 μm), 5.7×10$^1$ [m$^{-1}$] for the coupled core group 110 of the sample 3 (Λ=17.5 μm), 2.1×10$^1$ [m$^{-1}$] for the coupled core group 110 of the sample 4 (Λ=20.0 μm), 2.6×10$^0$ [m$^{-1}$] for the coupled core group 110 of the sample 5 (Λ=25.0 μm), and 9.4×10$^{-1}$ [m$^{-1}$] for the coupled core group 110 of the sample 6 (Λ=27.5 μm). The mode coupling coefficients of the prepared samples 1 to 6 fall within a range of from 1×10$^{-1}$ [m$^{-1}$] to 1×10$^3$ [m$^{-1}$].

Further, calculated values of the coefficient of power coupling between the cores of each coupled core group 110 of each of the samples 1 to 6 at the wavelength of 1550 nm are 7.6×10$^1$ [m$^{-1}$] for the coupled core group 110 of the sample 1 (Λ=12.5 μm), 8.1×10$^0$ [m$^{-1}$] for the coupled core group 110 of the sample 2 (Λ=15.0 μm), 9.0×10$^{-1}$ [m$^{-1}$] for the coupled core group 110 of the sample 3 (Λ=17.5 μm), 1.0×10$^{-1}$ [m$^{-1}$] for the coupled core group 110 of the sample 4 (Λ=20.0 jam), 1.3×10$^3$ [m$^{-1}$] for the coupled core group 110 of the sample 5 (Λ=25.0 μm), and 1.5×10$^{-4}$ [m$^{-1}$] for the coupled core group 110 of the sample 6 (Λ=27.5 μm).

As described above, the mode coupling coefficients of the prepared samples 1 to 6 fall within a range of from 1×10$^{-1}$ [m$^{-1}$] to 1×10$^3$ [m$^{-1}$], but under specific conditions, it is possible to narrow down the mode coupling coefficient and the power coupling coefficient. That is, as can be seen from FIGS. 4A and 4B, for the coupled core group of the sample 6, the 20 dB full width of the impulse response sharply increases. In order to achieve 1.1 ns or less to be the same 20 dB full width of the impulse response as the coupled core group of the sample 5 that avoids a sharp increase in the 20 dB full width of the impulse response, it is desirable that the mode coupling coefficient fall within a range of from 2.6× 10$^0$ [m$^{-1}$] to 1.6×10$^2$ [m$^{-1}$] and that the power coupling coefficient fall within a range of from 1.3×10$^{-3}$ [m$^{-1}$] to 8.1×10$^0$ [m$^{-1}$]. Furthermore, in order for the 20 dB full width of the impulse response to be the smallest level of 0.4 ns or less, it is more desirable that the mode coupling coefficient fall within a range of from 2.1×10$^1$ [m$^{-1}$] to 5.7×10$^1$ [m$^{-1}$] and that the power coupling coefficient fall within a range of from 1.0×10$^{-1}$ [m$^{-1}$] to 9.0×10$^{-1}$ [m$^{-1}$]. Therefore, in the MCF 100 according to the embodiment, the core center-to-center distance Λ of each coupled core group 110 can be set so as to satisfy the above-described limited range of the mode coupling coefficient or the power coupling coefficient.

Furthermore, it is desirable that the MCF 100 according to the embodiment be suitably bent. Further, it is desirable that torsion about the center of the common cladding (the center in the cross section of the common cladding 120 orthogonal to the longitudinal direction of the MCF 100) serving as a turning axis be applied to the MCF 100 according to the embodiment. Such torsion may be applied when glass is melted during optical fiber drawing, or may be applied in a state where the glass is solidified after the optical fiber drawing.

Next, a consideration will be given to reduction of accumulation of DGD between spatial modes. It can be assumed that the DGD between spatial modes increases in proportion to L in accordance with the following Expression (4):

$$DGD = aL^b \tag{4}$$

where L represents the fiber length of the MCF, and a represents a constant of proportionality.

Figure 5A:
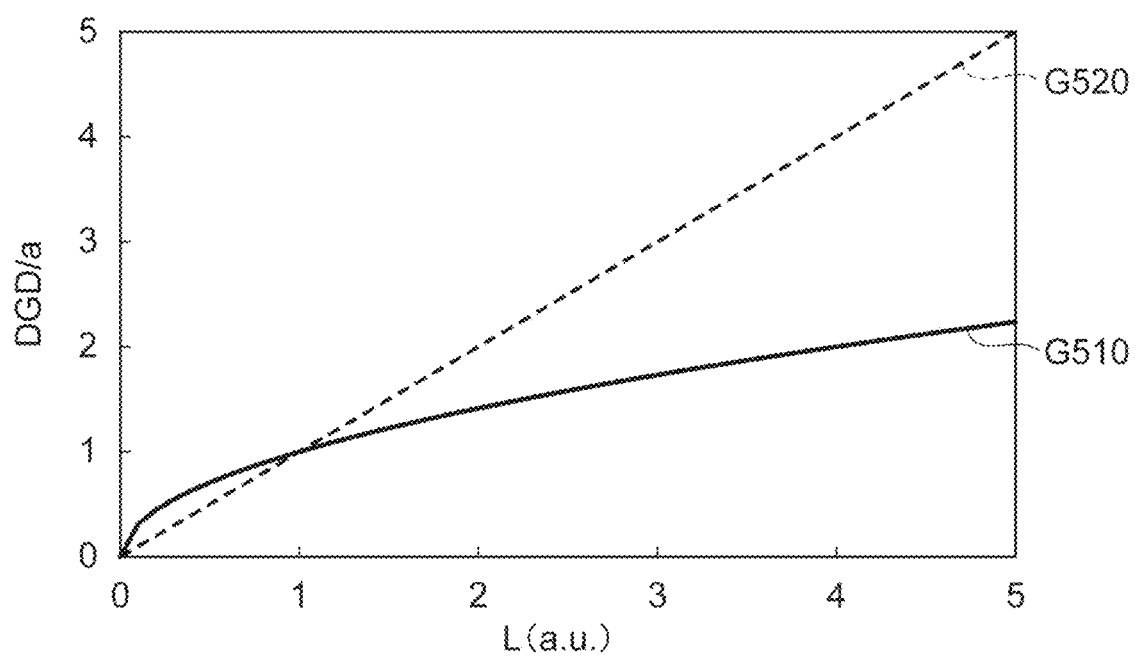

It is also known, from examples such as polarization mode dispersion, that, when there is no random coupling between spatial modes, the DGD between spatial modes becomes the largest b=1, and when there is sufficient random coupling between spatial modes, the increase in the DGD between spatial modes slows down (b=0.5) in proportion to the increase in the fiber length L. FIG. 5A is a diagram showing a relationship between DGD/a and the fiber length L, in which a graph G510 represents a relationship when b=0.5, and a graph G520 represents a relationship when b=1.

Herein, the inventor has checked, by random simulation calculation, what value b has when the constant of proportionality a is set to a DGD scaling factor and, b is set to a DGD growth rate. The simulations are made using a mode-coupling equation for core modes. Assuming that the polarization mode degenerates for the sake of simplicity, a mode coupling equation for two cores (that is, a total of two modes) in which the degenerate mode is ignored can be expressed by the following Expression (5):

$$\frac{\partial}{\partial z}\begin{bmatrix} E_1(\omega, z) \\ E_2(\omega, z) \end{bmatrix} = \tag{5}$$

$$-j \begin{bmatrix} \beta_1(\omega)\left(1 + \frac{\Lambda}{2}C(z)\cos\theta(z)\right) & \kappa(\omega) \\ \kappa(\omega) & \beta_2(\omega)\left(1 + \frac{\Lambda}{2}C(z)\cos\theta(z)\right) \end{bmatrix}$$

$$\begin{bmatrix} E_1(\omega, z) \\ E_2(\omega, z) \end{bmatrix}.$$

where κ represents the coefficient of mode coupling between cores, β represents the propagation constant of each core, Λ represents the core center-to-center distance (center-to-center distance between cores), C represents the fiber bending curvature (the reciprocal of the bending radius), and θ represents the fiber turning angle with respect to the bending direction based on a certain standard. Further, a subscript of each parameter represents the core number.

Solving the above Expression (5) can obtain a transfer equation of z=L to z=0 like the following Expression (6):

$$\begin{bmatrix} E_1(\omega, z = L) \\ E_2(\omega, z = L) \end{bmatrix} = T \begin{bmatrix} E_1(\omega, z = 0) \\ E_2(\omega, z = 0) \end{bmatrix}. \quad (6)$$

where, T represents a transfer matrix of the number of cores (total number of modes) × the number of cores (total number of modes). The transfer matrix T is transformed into the form of a group-delay operator described in Non-Patent Document 3 to obtain an eigenvalue of the group-delay operator matrix, and the DGD between spatial modes can be simulated by using a difference between the maximum value and minimum value of the eigenvalue.

Figure 5B:
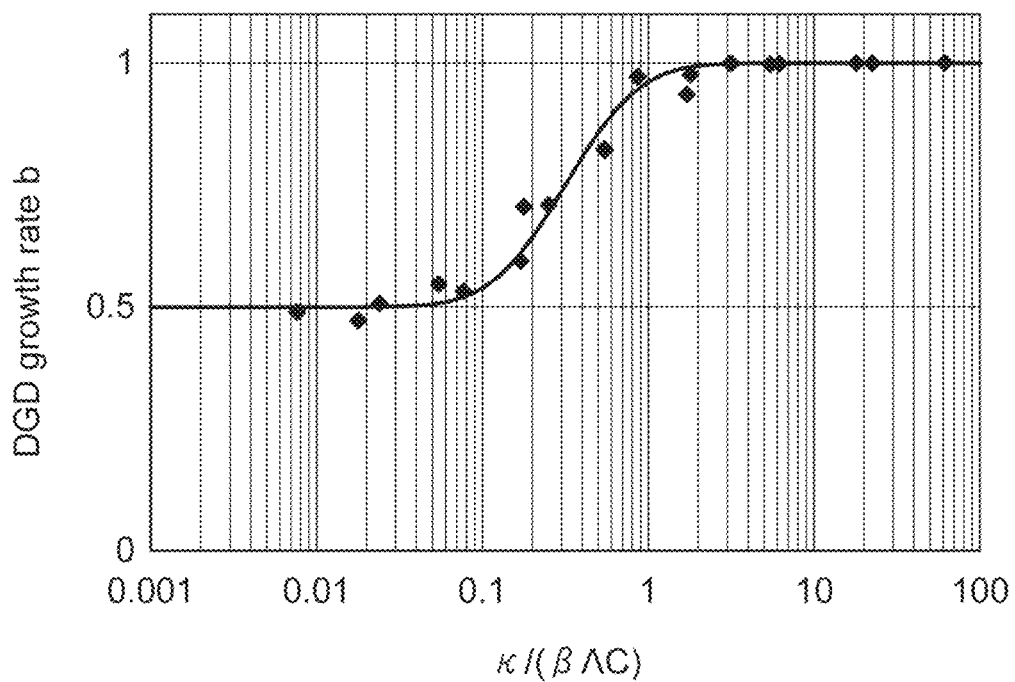
FIG. 5B is a graph showing a relationship between the parameter b in Expression (1) and $\kappa/(\beta\Lambda C)$.

FIG. 5B shows a result of calculation of change rates of $\Lambda$, C, and $\theta$ for z at a plurality of levels in the wavelength band of from 1530 nm to 1625 nm. Note that it can be assumed that the coefficient of mode coupling between adjacent cores is $\kappa$, the propagation constant of each of the adjacent cores is $\beta$ (here, it is assumed that two cores have the same propagation constant), and the core center-to-center distance (center-to-center distance between the adjacent cores) is $\Lambda$. From the result shown in FIG. 5B, it is shown that the DGD growth rate b shows a clear dependence on $\kappa/(\beta\Lambda C)$. Here, $\kappa$ to be a numerator of $\kappa/(\beta\Lambda C)$ denotes coupling of electric field amplitudes of two adjacent cores as known from that $\kappa$ is included in non-diagonal elements of the above-described Expression (5) and ($\beta\Lambda C$) to be a denominator denotes a maximum value of a difference of equivalent propagation constants affected by bending to be a diagonal element (in other words, perturbation applied by fiber bending to the core mode propagation constant). When $\kappa/(\beta\Lambda C)$ is 0.1 or less, b takes a value near 0.5, while b approaches 1 as $\kappa/(\beta\Lambda C)$ approaches from 0.1 to 1, and b becomes 1 when $\kappa/(\beta\Lambda C)$ is 1 or more. Therefore, in order to reduce the DGD between spatial modes, it is necessary to adjust the core structure and core arrangement to make $\kappa/(\beta\Lambda C)$ 0.1 or less. That is, it is desirable that $\kappa/(\beta\Lambda C)$ be 0.1 or less in order to reduce DGD between spatial modes.

This result indicates that, when the propagation constant difference slightly changes along the longitudinal direction of the MCF, or the mode coupling between cores is too strong ($\beta\Lambda C \ll \kappa$, that is, $\kappa/(\beta\Lambda C) \gg 1$), for stable propagation of super modes in which the core modes are coupled, the super modes are uncoupled, and a DGD between the super modes accumulates at b=1. On the other hand, it can be understood that, when the coefficient of mode coupling between cores is in an appropriate range, and the propagation constant difference changes along the longitudinal direction of the MCF (PAC to be the maximum value of change is large, that is, $\kappa/(\beta\Lambda C)$ is small), random coupling between spatial modes occurs, b approaches 0.5, and the accumulation of the DGD between spatial modes slows down.

Therefore, with average curvature of bending of the MCF in the cable along the fiber longitudinal direction of the MCF denoted by $C_{avg}$ [m$^{-1}$], a coefficient of mode coupling between adjacent cores in the coupled core group denoted by $\kappa$ [m$^{-1}$], an average of propagation constants of the adjacent cores in the coupled core group denoted by $\beta$ [m$^{-1}$], and a core center-to-center distance between the adjacent cores in the coupled core group denoted by $\Lambda$ [m], incorporating the MCF whose core structure and core arrangement have been adjusted in order to make $\kappa/(\beta\Lambda C_{avg})$ 0.1 or less in the wavelength band of from 1530 nm to 1625 nm, makes it possible to reduce the accumulation of the DGD between spatial modes in the MCF cable. Further, the larger the core center-to-center distance, the smaller $\kappa/(\beta\Lambda C_{avg})$; therefore, when $\kappa/(\beta\Lambda C_{avg})$ is too small, the core density decreases, the coupling between cores becomes weak, and the mode coupling itself becomes very weak. This prevents sufficient random mode coupling necessary for reducing the DGD between spatial modes from occurring.

Therefore, $\kappa/(\beta\Lambda C_{avg})$ is preferably 0.01 or more. Note that, at this time, $C_{avg}$ may be average curvature applied to bending of the MCF after sufficiently control, or may be average curvature including bending curvature that is unintentionally applied. Specifically, $C_{avg}$ preferably falls within a range of from 0.1 [m$^{-1}$] to 20 [m$^{-1}$], with no bending applied to the cable. Further, $C_{avg}$ only needs to fall within at least one of a first range of 0.3 [m$^{-1}$] or more with no bending is applied to the cable or a second range of 10 [m$^{-1}$] or less with no bending applied to the cable.

Further, with a consideration given based on Non-Patent Document 4 and Non-Patent Document 5, even when the MCF is in a linear state (even when the actual C is 0), it can be assumed that fluctuations or micro-bending along the longitudinal direction of the fiber structure causes fluctuations in propagation constant difference between cores along the longitudinal direction of the MCF, the fluctuations being equivalent to fluctuations when C (=$C_f$) in a range of from 0.01 [m$^{-1}$] to 1 [m$^{-1}$], or a range of from 0.1 [m$^{-1}$] to 1 [m$^{-1}$], is applied. The curvature C with such an optical fiber extending straight can be estimated with pseudo-curvature $C_f$ [m−1]=$C_{bend} \cdot h_b/h_s$ ($h_b$ represents a coefficient of power coupling between cores with the optical fiber bent with the curvature $C_{bend}$ of 5 [m$^{-1}$] or more, and $h_s$ represents a coefficient of power coupling between cores with the optical fiber extending straight with the curvature of 0.1 [m$^{-1}$] or less), incorporating the MCF whose core structure and core arrangement have been adjusted in order to make $\kappa/(\beta\Lambda C_f)$ 0.1 or less in the wavelength band of from 1530 nm to 1625 nm, makes it possible to reduce the accumulation of the DGD between spatial modes in the MCF cable. Further, the larger the core center-to-center distance, the smaller $\kappa/(\beta\Lambda C_f)$; therefore, when $\kappa/(\beta\Lambda C_f)$ is too small, the core density decreases, the coupling between cores becomes weak, and the mode coupling itself becomes very weak. This prevents sufficient random mode coupling necessary for reducing the DGD between spatial modes from occurring. Therefore, $\kappa/(\beta\Lambda C_f)$ is preferably 0.01 or more.

Hereinafter, a description will be given of the lower limit of $\kappa/(\beta\Lambda C_{avg})$ for a sample of the MCF according to the embodiment and a comparative example.

The sample prototyped as the MCF according to the embodiment includes two to seven cores each having ring-type refractive index profile, a common optical cladding that covers the cores, and a physical cladding that covers the optical cladding and has an outer diameter of 125 μm. When each core has an outer diameter of about 11.3 μm, and $\Delta$ represents a relative refractive index difference based on the refractive index of pure silica, a difference between $\Delta$ of the average area of the core and $\Delta$ of the optical cladding is about 0.34%, $\Delta$ of the physical cladding is higher than the $\Delta$ of the optical cladding, and a difference between the $\Delta$ of the physical cladding and the $\Delta$ of the optical cladding falls within a range of from 0.05% to 0.1%.

$$D_j/a \geq 7.68 \times 10^{-2} \cdot (\log_{10}(D_{offset}/a))^2 - 2.21 \times 10^{-1} \cdot (\log_{10}(D_{offset}/a)) + 3.15$$

or $$D_J/a \geq 7.57 \times 10^{-2} \cdot (\log_{10}(D_{offset}/a))^2 - 2.25 \times 10^{-1} \cdot (\log_{10}(D_{offset}/a)) + 3.40$$

is satisfied, where $D_J$ represents the shortest distance between the physical cladding and the center of a core closest to the physical cladding, a represents the radius of the closest core, and $D_{offset}$ represents a distance between the center of the closest core and the center of the optical cladding.

In such the sample of the MCF, measurement of a value of spatial mode dispersion (root mean square of the DGD between spatial modes) with $\kappa/(\beta \Lambda C)$ adjusted to be $2.7 \times 10^{-2}$ results in 6.1 ps/km$^{1/2}$.

On the other hand, in the comparative example, measurement of a value of spatial mode dispersion with $\kappa/(\beta \Lambda C)$ adjusted to be $2 \times 10^{-3}$ or more and $3 \times 10^{-3}$ or less results in about 32 ps/km$^{1/2}$, which is nearly five times worse than the sample of the MCF according to the embodiment in which $\kappa/(\beta \Lambda C)$ is 0.01 or more.

Note that, in the MCF according to the embodiment, the cores and the common cladding are preferably made of glass or silica glass. Further, the common cladding may be covered with a protective member made of, for example, resin, metal, or carbon. A trace amount of alkali metal may be added to glass of each core.

As desirable characteristics for increasing an optical signal-to-noise ratio during long-haul transmission, the transmission loss during all-mode excitation is preferably 0.20 dB/km or less, 0.18 dB/km or less, 0.16 dB/km or less, or 0.15 dB/km or less, in the wavelength band of from 1530 nm to 1565 nm or the wavelength band of from 1460 nm to 1625 nm. The mode average of chromatic dispersion is preferably 16 ps/(nm·km) or more. In all the spatial modes, the bending loss when wound on a mandrel with a diameter of 30 mm for one turn is preferably 0.2 dB or less at the wavelength of 1550 nm. In all the spatial modes, the bending loss when wound on a mandrel with a diameter of 20 mm is preferably 20 dB/m or less at the wavelength of 1550 nm. In all the spatial modes, the bending loss when wound on a mandrel with a radius of 30 mm for 100 turns is preferably 0.5 dB or less at the wavelength of 1550 nm. In the wavelength band of from 1530 nm to 1565 nm or the wavelength band of from 1460 nm to 1625 nm, the average of mode-dependent loss is preferably 0.01 dB/km$^{1/2}$ or less. In the wavelength band of from 1530 nm to 1565 nm or the wavelength band of from 1460 nm to 1625 nm, the average of maximum DGD between spatial modes at each wavelength is preferably 10 ps/km$^{1/2}$ or less. Note that the MCF cable including MCFs each having the above-described characteristics has, in its entirety, an average of spatial mode dispersion is 10 ps/km$^{1/2}$ or less in the wavelength band of from 1530 nm to 1565 nm or the wavelength band of from 1460 nm to 1625 nm.

Furthermore, as a desirable characteristic of the MCF according to the embodiment, under application of external stress, it is desirable that the effective area of spatial mode localized in each be 60 μm$^2$ or more and 180 μm$^2$ or less in all spatial modes in order to increase the optical signal-to-noise ratio during long-haul transmission.

As a structure for obtaining the desirable characteristics, in the MCF according to the embodiment, it is preferable that the common cladding include a common optical cladding that covers all the plurality of cores making up the coupled core group and a physical cladding that covers the periphery of the optical cladding. In particular, as a core structure desirable for enabling the above-described characteristics, it is preferable that the outer diameter of each of the cores be 6 μm or more and 15 μm or less. Further, in the cross section of the MCF orthogonal to the longitudinal direction, when the relative refractive index difference based on the refractive index of pure silica is denoted by Δ, it is preferable that the difference between Δ of the area-weighted average of each of the cores and Δ of the optical cladding fall within a range of from 0.2% to 0.5%, that Δ of the physical cladding be greater than the Δ of the optical cladding, and that a difference between the Δ of the physical cladding and the Δ of the optical cladding fall within a range of from 0.0% to 1%, a range of from 0.0% to 0.5%, or a range of from 0.0% to 0.35%.

The MCF according to the embodiment having the core structure as described above preferably has the following structure in order to increase the number of cores in the physical cladding having an outer diameter of 125 μm. That is, the coupled core group includes 2 to 7 cores, or 8 to 15 cores. The outer diameter of the physical cladding is 125±1 μm (a range of from 124 μm to 126 μm). In order to suppress an increase in transmission loss due to the OH group in the physical cladding or the interface between the optical cladding and the physical cladding, it is preferable that $$D_J/a \geq 7.68 \times 10^{-2} \cdot (\log_{10}(D_{offset}/a))^2 - 2.21 \times 10^{-1} \cdot (\log_{10}(D_{offset}/a)) + 3.15$$

or $$D_J/a \geq 7.57 \times 10^{-2} \cdot (\log_{10}(D_{offset}/a))^2 - 2.25 \times 10^{-1} \cdot (\log_{10}(D_{offset}/a)) + 3.40$$

be satisfied, where $D_J$ represents the shortest distance between the physical cladding and the center of a core closest to the physical cladding, a represents the radius of the closest core, and $D_{offset}$ represents the distance between the center of the optical cladding and the center of the closest core.

A consideration will be given below to conditions such as the coefficient of mode coupling between cores, the core center-to-center distance, the fiber bending radius, and the fiber torsion (average torsion $f_{twist}$) in the coupled core group 110 for causing random mode coupling necessary for effectively suppressing the accumulation of DGD and loss difference between spatial modes.

As described above, it is assumed that the DGD between spatial modes increases in proportion to the fiber length L in accordance with Expression (4). Therefore, as also shown in FIG. 5A, when the random mode coupling does not occur between spatial modes, the DGD between spatial modes follows the graph G520 (b=1). On the other hand, when the random mode coupling sufficiently occurs between spatial modes, the DGD between spatial modes follows the graph G520 (b=0.5). This is also known from examples such as polarization mode dispersion.

Here, in order to bring b close to 0.5, it is desirable that more random mode coupling occur between eigenmodes of the optical fiber, and components of light guided in each mode be exchanged between spatial modes. Originally, the eigenmodes are orthogonal to each other, and mode coupling during propagation should not occur. However, due to changes or fluctuations along the longitudinal direction of the optical fiber, such as changes in bending radius, changes in fiber torsion, minute changes in glass structure, and application of random and minute bending imparted by micro-bending, eigenmode electric field distribution changes in a manner that depends on the fiber position. Such changes or fluctuations along the longitudinal direction breaks the orthogonality between eigenmodes, and as a result, mode coupling occurs between eigenmodes.

Here, it is assumed that the optical fiber is represented by a series of minute uniform sections. In addition, it is assumed that power coupling between eigenmodes occurs due to a mismatch of electric field distribution between connection points of the sections caused by a change in eigenmode electric field distribution between adjacent sections. Through calculation of the power coupling between two cores on these assumptions, it has been confirmed that the power coupling is maximized at a longitudinal position (phase matching point) of the fiber where a line segment connecting the cores is orthogonal to the fiber bending radius direction. Note that the power coupling coefficient between eigenmodes is maximized at the phase matching point, as has been made clear in existing document such as Non-Patent Document 6 described above.

Next, it has been revealed through calculation of a condition under which the random mode coupling most frequently occurs when passing through the phase matching point once (the power is equally divided into two for the two cores at the time of incidence on one core) that the random coupling most frequently occurs when the following Expression (7) is satisfied, regardless of the core propagation constant $\beta$, the core center-to-center distance $\Lambda$, the coefficient $\kappa$ of mode coupling between cores, the fiber bending curvature (the reciprocal of the bending radius) $C$, and the average fiber torsion $f_{twist}$ ([turns/m]: how many turns the fiber twists per unit length):

$$\frac{\beta \Lambda C}{2\kappa} = \rho \sqrt{1 + \left(a \frac{\kappa}{f_{twist}}\right)^2} \quad (7)$$

$$\rho = \begin{cases} 1 - \frac{d}{2} \frac{\ln\left(\frac{\kappa/f_{twist}}{b}\right)^{\frac{c}{2}}}{\left(\frac{\kappa/f_{twist}}{b}\right)^{\frac{c}{2}}}, & (\kappa/f_{twist} < b) \\ 1, & (\kappa/f_{twist} \geq b) \end{cases}$$

$a = 0.722$ $b = 3.867207$ $c = -4.172137$ $d = 1.715737.$

Figure 6:
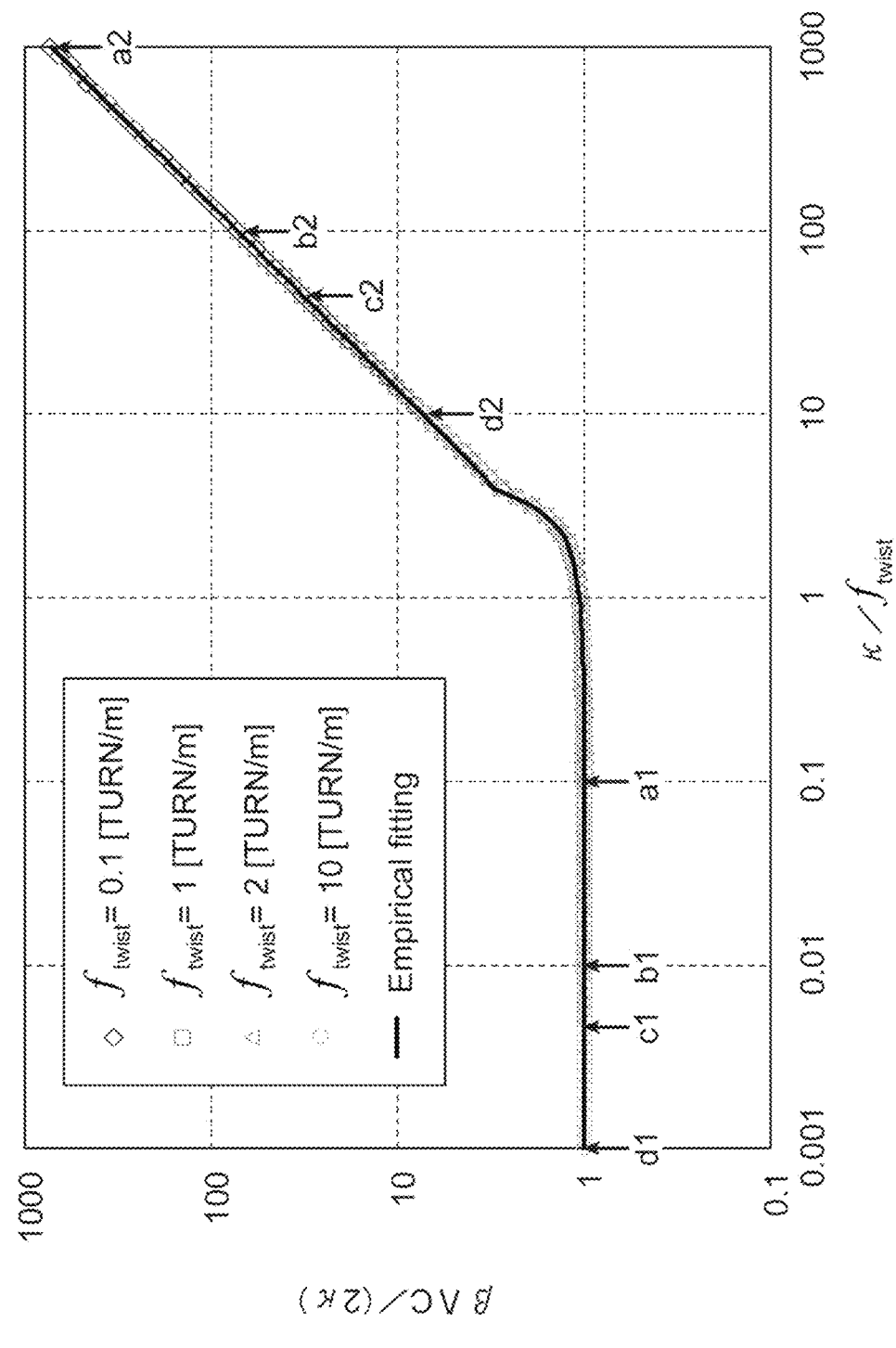
FIG. 6 is a graph showing a simulation result with varying average torsion $f_{twist}$ [turn/m], showing a relationship between $\beta\Lambda C/(2\kappa)$ and $\kappa/f_{twist}$ in which mode coupling with the maximum randomness occurs.

Each mark in FIG. 6 represents a relationship between $\beta\Lambda C/(2\kappa)$ and $\kappa/f_{twist}$, where the random coupling most frequently occurs, obtained by numerical simulation, and the solid line is a line plotted in accordance with the empirically-obtained Expression described above (Empirical fitting). As can be seen from FIG. 6, it is possible to uniquely represent the condition under which the random mode coupling most frequently occurs independently of a difference in the average torsion $f_{twist}$ or the like.

In FIG. 6, a position indicated by arrow a1 indicates the lower limit of $\kappa/f_{twist}$ when $f_{twist}$=0.1 [turn/m], and a position indicated by arrow a2 indicates the upper limit of $\kappa/f_{twist}$ when $f_{twist}$=0.1 [turn/m]. Similarly, a position indicated by arrow b1 indicates the lower limit of $\kappa/f_{twist}$ when $f_{twist}$=1 [turn/m], and a position indicated by arrow b2 indicates the upper limit of $\kappa/f_{twist}$ when $f_{twist}$=1 [turn/m]. A position indicated by arrow c1 indicates the lower limit of $\kappa/f_{twist}$ when $f_{twist}$=2 [turn/m], and a position indicated by arrow c2 indicates the upper limit of $\kappa/f_{twist}$ when $f_{twist}$=2 [turn/m]. A position indicated by arrow d1 indicates the lower limit of $\kappa/f_{twist}$ when $f_{twist}$=10 [turn/m], and a position indicated by arrow d2 indicates the upper limit of $\kappa/f_{twist}$ when $f_{twist}$=10 [turn/m]. Therefore, the simulation result when $f_{twist}$=0.1 [turn/m] is plotted in a section between the position of arrow a1 and the position of arrow a2. The simulation result when $f_{twist}$=1 [turn/m] is plotted in a section between the position of arrow b1 and the position of arrow b2. The simulation result when $f_{twist}$=2 [turn/m] is plotted in a section between the position of arrow c1 and the position of arrow c2. The simulation result when $f_{twist}$=10 [turn/m] is plotted in a section between the position of arrow d1 and the position of arrow d2.

As the power coupling ratio when passing through one phase matching point is closer to 0.5 (=b), the random mode coupling more easily occurs. On the other hand, it is undesirable that, when the power coupling ratio between eigenmodes becomes equal to 1, complete non-random power transfer occurs between eigenmodes, which brings mode coupling between core modes into an uncoupled state and causes the DGD and loss difference between core modes to be accumulated.

Therefore, with $\beta\Lambda C/(2\kappa)(=[2\kappa/(\beta\Lambda C)]^{-1})$ denoted by X (C is $C_{avg}$ or $C_f$), the value of X that maximizes the randomness of mode coupling between spatial modes is obtained by the above-described Expression (7) and the following Expression (8):

$$X = \rho \sqrt{1 + \left(a \frac{\kappa}{f_{twist}}\right)^2}. \quad (8)$$

Herein, the "randomness" of mode coupling between spatial modes is represented, using the above-described Expression (8) as an index.

Compared with the above-described Expression (8) representing the maximum randomness where the power coupling ratio is 0.5 when passing through one phase matching point, when mode coupling with randomness of at least one tenth is enabled, it is preferable that the value of X fall within a range represented by the following Expression (9a) and Expression (9b):

$$0.22\rho \sqrt{1 + \left(a \frac{\kappa}{f_{twist}}\right)^2} \leq X \quad (9a)$$

$$X \leq 13.5\rho \sqrt{1 + \left(a \frac{\kappa}{f_{twist}}\right)^2}. \quad (9b)$$

Compared with the above-described Expression (8), when mode coupling with randomness of at least one fifth is enabled, it is preferable that the value of X fall within a range represented by the following Expression (10a) and Expression (10b):

$$0.30\rho \sqrt{1 + \left(a \frac{\kappa}{f_{twist}}\right)^2} \leq X \quad (10a)$$

$$X \leq 6.6\rho \sqrt{1 + \left(a \frac{\kappa}{f_{twist}}\right)^2}. \quad (10b)$$

Furthermore, compared with the above-described Expression (8), when mode coupling with randomness of at least one half is enabled, it is preferable that the value of X fall within a range represented by the following Expression (11a) and Expression (11b):

$$0.50\rho\sqrt{1+\left(a\frac{\kappa}{f_{twist}}\right)^2} \leq X \quad (11a)$$

$$X \leq 2.4\rho\sqrt{1+\left(a\frac{\kappa}{f_{twist}}\right)^2}. \quad (911b)$$

REFERENCE SIGNS LIST

1 ... optical fiber transmission system; 10 ... transmitting station; 11 ... transmitter ($TX_1$ to $TX_N$); 12 ... connector; 20 ... receiving station; 21 ... receiver ($RX_1$ to $RX_N$); 100 ... multicore optical fiber (MCF); 110 ... coupled core group; 120 ... common cladding; and 300 ... multicore optical fiber cable (MCF cable).

The invention claimed is:

1. A multicore optical fiber cable containing multicore optical fibers each comprising at least one coupled core group and a common cladding, the coupled core group including a plurality of cores, and the common cladding surrounding the coupled core group, wherein in each of the multicore optical fibers,
   a core center-to-center distance $\Lambda$ [m] between adjacent cores of the plurality of cores is set so as to make a coefficient $\kappa$ of mode coupling between the adjacent cores at a wavelength of 1550 nm fall within a range of from $1\times10^{-1}$ [$m^{-1}$] to $1\times10^3$ [$m^{-1}$], and
   a value of X defined by $(\beta\Lambda C_{avg})/(2\kappa)$ or $(\beta\Lambda C_f)/(2\kappa)$ in a wavelength band of from 1530 nm to 1625 nm satisfies Expression (1):

$$0.22\rho\sqrt{1+\left(a\frac{\kappa}{f_{twist}}\right)^2} \leq X \leq 13.5\rho\sqrt{1+\left(a\frac{\kappa}{f_{twist}}\right)^2} \quad (1)$$

$$\rho = \begin{cases} 1 - \frac{d}{2}\frac{\ln\left(\frac{\kappa/f_{twist}}{b}\right)^{\frac{c}{2}}}{\left(\frac{\kappa/f_{twist}}{b}\right)^{\frac{c}{2}}}, & (\kappa/f_{twist} < b) \\ 1, & (\kappa/f_{twist} \geq b) \end{cases}$$

$a = 0.722$
$b = 3.867207$
$c = -4.172137$
$d = 1.715737$, where $C_{avg}$ [$m^{-1}$] represents an average curvature of bending of the multicore optical fiber along a longitudinal direction of the multicore optical fiber with no bending applied to the multicore optical fiber cable,
$C_f$ [$m^{-1}$] represents a pseudo-curvature of the multicore optical fiber,
$f_{twist}$ [turn/m] represents an average torsion of the multicore optical fiber, and
$\beta$ [$m^{-1}$] represents an average of propagation constants of the adjacent cores.

2. The multicore optical fiber cable according to claim 1, wherein for each of the multicore optical fibers, the value of X satisfies Expression (2):

$$0.30\rho\sqrt{1+\left(a\frac{\kappa}{f_{twist}}\right)^2} \leq X \leq 6.6\rho\sqrt{1+\left(a\frac{\kappa}{f_{twist}}\right)^2}. \quad (2)$$

3. The multicore optical fiber cable according to claim 1, wherein
   the average curvature $C_{avg}$ falls within a range of from 0.1 [$m^{-1}$] to 20 [$m^{-1}$].

4. The multicore optical fiber cable according to claim 1, wherein
   the pseudo-curvature $C_f$ falls within a range of from 0.01 [$m^{-1}$] to 1 [$m^{-1}$].

5. The multicore optical fiber cable according to claim 1, wherein
   the average curvature $C_{avg}$ falls within at least one of a first range of 0.3 [$m^{-1}$] or more and a second range of 10 [$m^{-1}$] or less.

6. The multicore optical fiber cable according to claim 1, wherein
   for each of the multicore optical fibers,
   a transmission loss during all-mode excitation is 0.20 dB/km or less, 0.18 dB/km or less, 0.16 dB/km or less, or, 0.15 dB/km or less, in the wavelength band of from 1530 nm to 1565 nm or a wavelength band of from 1460 nm to 1625 nm,
   a mode average of chromatic dispersion is 16 ps/(nmkm) or more,
   in all spatial modes, bending loss in a condition wound on a mandrel with a diameter of 30 mm for one turn is 0.2 dB or less at the wavelength of 1550 nm,
   in all the spatial modes, bending loss in a condition wound on a mandrel with a diameter of 20 mm is 20 dB/m or less at the wavelength of 1550 nm,
   in all the spatial modes, bending loss in a condition wound on a mandrel with a radius of 30 mm for 100 turns is 0.5 dB or less at the wavelength of 1550 nm,
   in the wavelength band of from 1530 nm to 1565 nm or the wavelength band of from 1460 nm to 1625 nm, an average of mode-dependent loss is 0.01 dB/$km^{1/2}$ or less, and
   in the wavelength band of from 1530 nm to 1565 nm or the wavelength band of from 1460 nm to 1625 nm, an average of spatial mode dispersion is 10 ps/$km^{1/2}$ or less.

7. A multicore optical fiber comprising at least one coupled core group and a common cladding, the coupled core group including a plurality of cores, and the common cladding surrounding the coupled core group, wherein
   a core center-to-center distance $\Lambda$ [m] between adjacent cores of the plurality of cores is set so as to make a coefficient $\kappa$ of mode coupling between the adjacent cores at a wavelength of 1550 nm fall within a range of from $1\times10^{-1}$ [$m^{-1}$] to $1\times10^3$ [$m^{-1}$], and
   in a state in which an average curvature $C_{avg}$ of bending of the multicore optical fiber along a longitudinal direction of the multicore optical fiber is set in a range of from 0.1 [$m^{-1}$] to 20 [$m^{-1}$] or a range of from 0.3 [$m^{-1}$] to 10 [$m^{-1}$], a value of X defined by $(\beta\Lambda C_{avg})/(2\kappa)$ or $(\beta\Lambda C_f)/(2\kappa)$ in a wavelength band of from 1530 nm to 1625 nm satisfies Expression (3):

$$0.22\rho\sqrt{1+\left(a\frac{\kappa}{f_{twist}}\right)^2} \leq X \leq 13.5\rho\sqrt{1+\left(a\frac{\kappa}{f_{twist}}\right)^2} \quad (3)$$

-continued $$\rho = \begin{cases} 1 - \dfrac{d}{2}\dfrac{\ln\left(\dfrac{\kappa/f_{twist}}{b}\right)^{\frac{c}{2}}}{\left(\dfrac{\kappa/f_{twist}}{b}\right)^{\frac{c}{2}}}, & (\kappa/f_{twist} < b) \\ 1, & (\kappa/f_{twist} \geq b) \end{cases}$$

$a = 0.722$ $b = 3.867207$ $c = -4.172137$ $d = 1.715737$, where $C_f$ [m$^{-1}$] represents a pseudo-curvature of the multicore optical fiber, $f_{twist}$ [turn/m] represents an average torsion of the multicore optical fiber, and $\beta$ [m$^{-1}$] represents an average of propagation constants of the adjacent cores.

8. The multicore optical fiber according to claim 7, wherein the pseudo-curvature $C_f$ falls within a range of from 0.01 [m$^{-1}$] to 1 [m$^{-1}$].

9. The multicore optical fiber according to claim 7, wherein a transmission loss during all-mode excitation is 0.20 dB/km or less, 0.18 dB/km or less, 0.16 dB/km or less, or, 0.15 dB/km or less, in the wavelength band of from 1530 nm to 1565 nm or a wavelength band of from 1460 nm to 1625 nm, a mode average of chromatic dispersion is 16 ps/(nm·km) or more, in all spatial modes, bending loss in a condition wound on a mandrel with a diameter of 30 mm for one turn is 0.2 dB or less at the wavelength of 1550 nm, in all the spatial modes, bending loss in a condition wound on a mandrel with a radius of 30 mm for 100 turns is 0.5 dB or less at the wavelength of 1550 nm, in the wavelength band of from 1530 nm to 1565 nm or the wavelength band of from 1460 nm to 1625 nm, an average of mode-dependent loss is 0.01 dB/km$^{1/2}$ or less, and in the wavelength band of from 1530 nm to 1565 nm or the wavelength band of from 1460 nm to 1625 nm, an average of maximum differential group delay between the spatial modes at each wavelength is 10 ps/km$^{1/2}$ or less.

10. The multicore optical fiber according to claim 7, wherein the common cladding includes a common optical cladding and a physical cladding, the optical cladding covering all the plurality of cores making up the coupled core group, and the physical cladding covering a periphery of the optical cladding, an outer diameter of each of the cores is 6 µm or more and 15 µm or less, in a cross section of the multicore optical fiber orthogonal to the longitudinal direction, a relative refractive index difference based on a refractive index of pure silica is denoted by $\Delta$, a difference between $\Delta$ of an area-weighted average of each of the cores and $\Delta$ of the optical cladding is 0.2% or more and 0.5% or less, $\Delta$ of the physical cladding is greater than the $\Delta$ of the optical cladding, and a difference between the $\Delta$ of the physical cladding and the $\Delta$ of the optical cladding is 0.0% or more and 0.35% or less.

11. The multicore optical fiber according to claim 10, wherein the coupled core group includes two to seven cores, an outer diameter of the physical cladding is 125±1 µm, and $$D_J/a \geq 7.68 \times 10^{-2} \cdot (\log_{10}(D_{offset}/a))^2 - 2.21 \times 10^{-1} \cdot (\log_{10}(D_{offset}/a)) + 3.15$$

or $$D_J/a \geq 7.57 \times 10^{-2} \cdot (\log_{10}(D_{offset}/a))^2 - 2.25 \times 10^{-1} \cdot (\log_{10}(D_{offset}/a)) + 3.40$$

is satisfied, where $D_J$ represents a shortest distance between the physical cladding and a center of a core closest to the physical cladding, a represents a radius of the closest core, and $D_{offset}$ represents a distance between a center of the optical cladding and the center of the closest core.

* * * * *